United States Patent
Williams

[11] 3,758,177
[45] Sept. 11, 1973

[54] AIR BEARINGS
[75] Inventor: Raymond Williams, Appleton, England
[73] Assignee: United Kingdom Atomic Energy Authority, London, England
[22] Filed: Mar. 9, 1971
[21] Appl. No.: 122,491

[30] Foreign Application Priority Data
Mar. 12, 1970 Great Britain.................. 12,053/70
Jan. 1, 1971 Great Britain.................. 13,471/71
Jan. 1, 1971 Great Britain.................. 13,571/71

[52] U.S. Cl. .................................................. 308/9
[51] Int. Cl. .............................................. F16c 17/16
[58] Field of Search ............................... 308/.001, 9

[56] References Cited
UNITED STATES PATENTS

| | | |
|---|---|---|
| 2,916,642 | 12/1959 | Macks................................ 308/.001 |
| 2,983,832 | 5/1961 | Macks................................ 308/.001 |
| 3,121,179 | 2/1964 | Macks................................ 308/.001 |
| 3,158,412 | 11/1964 | Willhoeft et al. .................. 308/.001 |
| 3,494,674 | 2/1970 | Muyderman et al................ 308/.001 |
| 3,497,273 | 2/1970 | Muyderman et al................ 308/.001 |
| 3,503,658 | 3/1970 | Remmers............................ 308/.001 |

OTHER PUBLICATIONS
IBM Technical Disclosure Bulletin Received in P.O. 1962.

Primary Examiner—Charles J. Myhre
Assistant Examiner—Frank Susko
Attorney—Larson, Taylor and Hinds

[57] ABSTRACT

A journal gas bearing assembly comprising a shaft and a bearing sleeve rotatable one relative to the other. Longitudinal movement of the shaft and 1 bearing sleeve relative to each other in the direction is limited by a hydrostatic thrust bearing formed by a cushion of gas trapped under pressure in a closed volume defined between the shaft and the bearing sleeve. Relative longitudinal movement between the shaft and the bearing sleeve in the reverse direction may be limited by providing for venting the closed volume at the beginning of relative longitudinal movement between the shaft and the bearing sleeve in the reverse direction or by providing a hydrodynamic thrust bearing between the shaft and the bearing sleeve acting in the opposite sense to the hydrostatic thrust bearing.

31 Claims, 9 Drawing Figures

AIR BEARINGS

BACKGROUND OF THE INVENTION

This invention relates to journal and bearing assemblies which operate with gas lubrication between the journal member and the bearing member.

A typical form of gas bearing assembly of the type referred to above comprises a shaft and a co-operating bearing sleeve, the surface of the shaft and the bore of the bearing sleeve being finished to an extremely high standard of accuracy and smoothness to provide bearing surfaces between which gas lubrication can be maintained under normal operating conditions.

There are two main types of journal gas bearing assembly.

In the first type, which is known as a hydrostatic pressure fed journal gas bearing, gas lubrication is maintained between the bearing surfaces of the shaft and the bearing sleeve by gas which is fed under pressure from an external source to the interspace defined beween the bearing surfaces.

In the second type, which is known as a hydrodynamic self-acting gas journal bearing, gas lubrication is maintained between the bearing surfaces of the shaft and the bearing sleeve by the pressure generated hydrodynamically in gas in the interspace defined between the bearing surfaces due to relative rotation of the shaft and the bearing sleeve.

Gas bearing assemblies of the kind referred to above can be made relatively cheaply, as disclosed in British Patent No. 979,731, by forming at least one of the bearing surfaces of the shaft and the bearing sleeve from a moulded plastic material such as an epoxy resin.

Both types of gas bearing assembly referred to above can be operated with the bearing sleeve rotatable on a stationary shaft or alternatively the shaft may be rotatable in a stationary bearing sleeve. In either case it is necessary to support the rotating member against longitudinal movement on the stationary member.

SUMMARY OF THE INVENTION

According to the present invention in a journal gas bearing assembly of the type comprising a shaft and a complementary bearing sleeve rotatable one relative to the other, the shaft and bearing sleeve having co-operating bearing surfaces of a quality such that gas lubrication can be sustained between the shaft and the bearing sleeve, longitudinal movement of the shaft and the bearing sleeve one relative to the other in one direction is limited by a hydrostatic thrust bearing formed by a cushion of gas trapped under pressure in a closed volume defined between the shaft and the bearing sleeve.

The provision of a hydrostatic thrust bearing in a gas journal bearing assembly as specified above only limits longitudinal movement of the bearing sleeve and the shaft relative one to the other in the one direction. Although such unidirectional longitudinal support is sufficient for many applications there is a requirement in some cases for the shaft and the bearing sleeve to be limited in longitudinal movement relative to each other in both directions so that precise longitudinal location of the rotating member of the bearing assembly is maintained during operation particularly at high speeds.

According to a further aspect of the present invention in a journal gas bearing assembly of the kind specified means are provided for limiting longitudinal movement of the shaft and the bearing sleeve one relative to the other in the reverse direction to the direction in which said hydrostatic thrust bearing limits relative longitudinal movement between the shaft and the bearing sleeve. For example means may be provided for venting the cushion of gas in the hydrostatic thrust bearing at the beginning of relative longitudinal movement between the shaft and the bearing sleeve in the reverse direction. Alternatively a hydrodynamic thrust bearing may be provided acting between the shaft and the bearing sleeve in the opposite sense to which the hydrostatic thrust bearing acts between the shaft and the bearing sleeve. In this case also, in order to reduce manufacturing costs, one or both of the bearing surfaces of the hydrodynamic gas bearing may be formed by a moulded plastic material.

Means may be provided for feeding compressed gas to the hydrostatic gas bearing, for instance from an external source of compressed gas. Alternatively compressed gas may be supplied from the interspace between the bearing surfaces of the shaft and the bearing sleeve to the hydrostaitc thrust bearing.

DESCRIPTION OF THE DRAWINGS

Embodiments of the invention will now be described by way of example with reference to the accompanying drawings in which.

DESCRIPTION OF THE PREFERRED EMBODIMENTS

Figure 1:
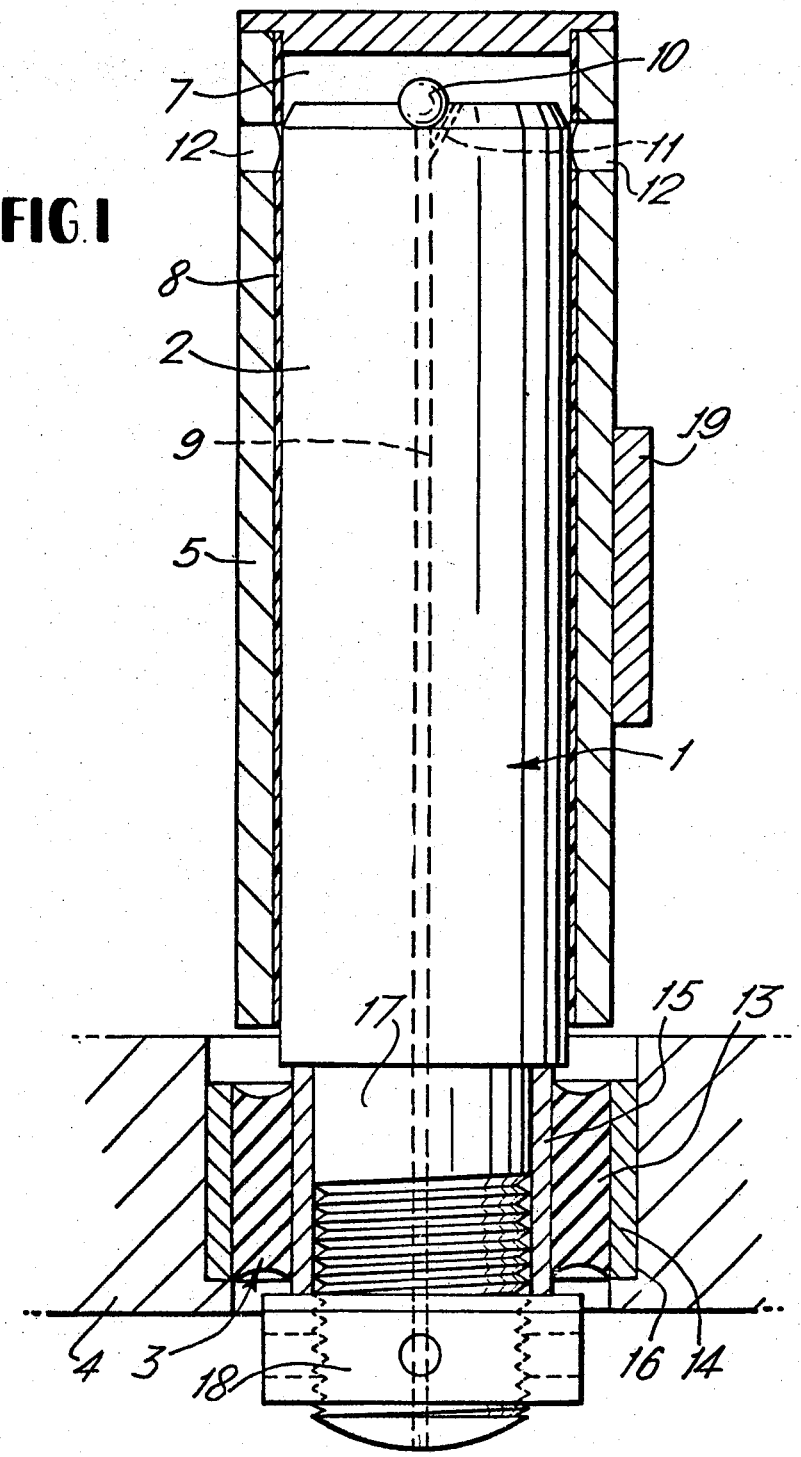
FIGS. 1 through 7 are elevations of journal gas bearing assemblies having a bearing sleeve rotatable on a stationary shaft.

Referring to FIG. 1 of the drawings a bearing assembly 1 is shown in which a hard faced shaft 2 is supported by a flexible mounting 3 in a support member 44. The shaft is surrounded by a close fitting bearing sleeve member 5 which is rotatable on the shaft 2. The bearing sleeve 5 has a blind ended bore which provides a trapped volume 7 between the blind end of the bearing sleeve 5 and the end of the shaft 2. The shaft 2 has a precision ground outer surface and the bore of the bearing sleeve 5 has a plastic lining 8 formed with a surface of gas bearing quality complementary to the surface of the shaft 2. The bearing surface in the plastic lining 8 of the bearing sleeve 5 may be formed for example by the method disclosed in British Patent No. 979,731.

The shaft 2 has a longitudinal drilling 9 which is sealed at the end of the shaft 2 inside the trapped volume 7 by a ball end stop 10. A feed jet 11 of small diameter than the drilling 9 connets the drilling 9, from just below the ball end stop 10, with the trapped volume 7. Adjacent the blind end of the bearing sleeve 5 there are two diametrically opposed vent ports 12.

The flexible mounting 3 comprises a ring 13 of soft rubber bonded between outer and inner metal sleeves 14 and 15. The outer metal sleeve 15 is an interference fit in a housing 16 in thesupport member 4. The shaft 2 has an end part 17 of reduced diameter which fits the inner metal sleeve 14 of the flexible mounting 3 and is threaded to fit a retaining nut 18.

In operation of the bearing assembly shown in FIG. 1 of the drawings the bearing sleeve 5 is driven on the shaft 2 by a friction drive belt 19 which engages the bearing sleeve 5 tangentially. The bearing assembly 1 operates as a hydrodynamic self acting gas journal bearing, transverse journal loads on the bearing sleeve 5 being supported by the pressure generated hydrodynamically in the air film in the interspace between the surface of the shaft 2 and the bearing surface in the plastic lining of the bearing sleeve 5.

Compressed air is fed into the trapped volume 7 at the blind end of the bearing sleeve 5 through the drilling 9 in the shaft 2. The pressurised cushion of air set up in the trapped volume 7 provides a hydrostatic thrust bearing supporting the bearing sleeve 5 longitudinally on the shaft 2. Under normal end loading conditions in the downwards direction the bearing sleeve 5 runs on the shaft 2 in the position shown in FIG. 1, that is with the vent ports just covered by the end of the shaft 2. The compressed air is fed through the drilling 9 in the shaft 2 at a pressure sufficient to support the bearing sleeve 5 against normal downwards end loading on the shaft 2. Transient variations in end loading acting on the bearing sleeve 5 are accommodated by longitudinal movement of the sleeve 5 on the shaft 2. For example a transient additional downwards end loading on the bearing sleeve 5 forces the bearing sleeve 5 down on the shaft 2. Because the ports 12 in the bearing sleeve 5 are covered by the end of the shaft 2 and because the feed jet 11 is a restricted cross section the additional downwards end loading acting on the bearing sleeve 5 is resisted by further compression of the air in the trapped volume 7. On return to normal end loading conditions the bearing sleeve 5 returns to its normal operational attitude on the shaft 2. On the other hand if the end loading acting downwardly on the bearing sleeve 5 reduces from normal the bearing sleeve 5 will lift on the shaft 2 so that the vent ports 12 in the bearing sleeve 5 are uncovered by the end of the shaft 2. Therefore the pressure of the cushion of gas in the trapped volume 7 falls to atmospheric pressure and the sleeve 5 drops back to assume its normal operational attitude on the shaft 2 when normal downwards end loading of the bearing sleeve 5 results.

Hydrodynamic self-acting journal gas bearings generally have a limiting speed of operation because of the difficulty of ensuring dynamic stability. The problem arises from the fact that the load carrying capacity of such bearing reaches a limiting value with increasing speed. In one form of instability the rotating member is subject to resonant oscillations at a critical speed which can result in damaging contact occuring between the bearing surfaces. One of the most serious forms of instability is the so called "half speed whirl" which results from the natural disposition of the rotating member of the bearing assembly to precess about a fixed centre at approximately the means rotational speed of the air film between the bearing surfaces and which is excited to a sufficiently large amplitude to cause extensive damage by contact between the bearing surfaces when the precessional speed coincides with a natural resonance frequency of the rotating member of the bearing assembly.

The bearing assembly of FIG. 1 has several features which are of general significance in raising the speed at which such self acting hydrodynamic gas journal bearings can be operated before the onset of operational instability occurs.

A self acting hydrodynamic gas journal bearing may be rendered stable at higher operating speeds by subjecting the rotating member to a side loading so that it runs eccentrically with respect to the stationary member. In the bearing assembly of FIG. 1 the friction drive belt 19 applies such a side loading on the bearing sleeve 5. Also the friction drive belt 19 engages with the bearing sleeve 5 within the effective bearing length. Thus the transverse loading applied by the drive belt 19 on the bearing sleeve 5 is fully supported by the drive belt 19 on the bearing sleeve 5 is fully supported by the bearing and this system imposes the minimum transverse couple on the bearing sleeve 5 which is another factor contributing to stability of operation of the bearing at high speeds.

The mounting of the shaft 2 from one end by the flexible mounting 3 permits three damped degrees of freedom of movement of the shaft 2.

In the first two degrees of freedom of movement of the shaft 2 it can oscillate with the bearing sleeve 5 in a cylindrical mode or in a conical mode about the rotational axis of the bearing sleeve 5. These modes of freedom of movement of the shaft 2 result in the damping out of damaging resonant oscillations of the bearing sleeve 5 therefore allowing the bearing assembly to be run at speeds higher than those theoretically possible in a bearing assembly having a rigidly mounted shaft. Also the flexible mounting of the shaft 2 prevents the onset of "half speed whirl" of the bearing sleeve by absorption of energy from the bearing vibration and dissipation of the energy through damping in the rubber ring 13 of the flexible mounting 3. The third mode of freedom of the shaft 2 is in the longitudinal direction which provides for the damping of longitudinal oscillations of the bearing sleeve 5 on the shaft 2.

Also in the bearing assembly of FIG. 1, the friction drive belt 19 acts on the outer surface of the bearing sleeve 5 at a greater radius that the radius of the bearing surfaces on the shaft 2 and in the lining 8 of the bearing sleeve 5. This means that the coefficient of friction between the drive belt 19 and the bearing sleeve 5 necessary in order to achieve drive of the bearing sleeve can be less than the coefficient of friction between the bearing surfaces. This enhances the ability of the bearing to start up from rest when maximum friction between the bearing surfaces exists. In addition the stationary shaft 2 has a low transverse moment of inertia so that it may readily follow any oscillations set up by the rotating bearing sleeve 5 either by resonance or out of balance forces and therefore reduces the loading imposed on the air film in the interspace between the surface of the shaft 2 and the bearing surface in the plastic lining of the bearing sleeve 5 consequently allowing larger amplitudes of oscillation to be tolerated.

The above described bearing assemblies are capable of operating at very high speeds and in order to do so, it is preferable that both the rotatable and stationary members have low transverse moments of inertia. In particular in the bearing assemblies having a stationary shaft around which a sleeve rotates it is preferable that the stationary shaft has a low moment of inertia. The friction drive applied to the rotatable members in the bearing assemblies may be by either a belt or wheel.

The flexible mountings may comprise any suitable elastomeric material in addition to soft rubber.

Figure 2:
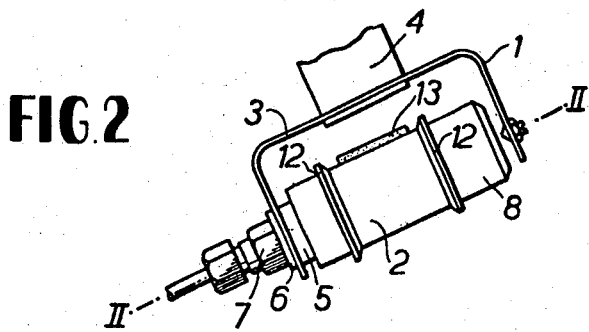
Figure 3:
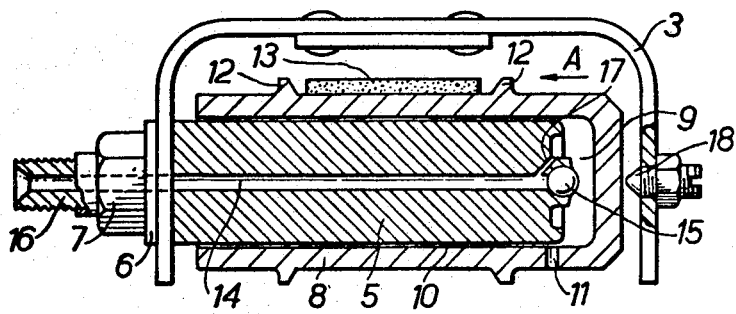

Referring to FIGS. 2 and 3 of the drawings a pulley assembly 1 is shown in which a jockey pulley 2 is located in a support member 3 which is attached to a structural member 4. A steel shaft 5 is mounted on the support member by a washer 6 and a nut 7. The shaft member 5 is surrounded by a close fitting aluminum sleeve member 8 having a blind end to provide a trapped volume 9 between the blind end of the sleeve member 8 and the end of the shaft 5. The sleeve 8 has a plastic lining 10 and a port 11 adjacent to the blind end of the sleeve 8. The outer surface of the sleeve member 8 is provided with two annular flanges 12 which are integral with the sleeve 8 on the shaft 5 and provide location for a driving belt 13 on the pulley 2. The shaft 5 has a precision ground outer surface and the plastic lining 10 of the sleeve 8 is formed with a surface of gas bearing quality complementary to the shaft 5. The plastic lining 10 of the sleeve 8 may be formed for example by the method disclosed in our British Patent No. 979,731.

The shaft 5 is provided with a longitudinal internal air duct 14, the end of which leads into the trapped volume 9 and is sealed by a ball end stop 15. An air feed pipe 16 is connected with the other end of the air duct 14. A feed jet 17 of reduced diameter immediately below the ball end stop 15 connects the air duct 14 with the trapped volume 9. Opposed to the blind end of the sleeve 18 is an adjustable end stop 18 located in the support member 3.

In operation of the arrangement of FIGS. 2 and 3 the sleeve 8 rotates on the shaft 5. The liner 10 of the sleeve 9 acts as a hydrodynamic air lubricated bearing on the shaft 5, journal loads on the sleeve being supported by the pressurised cushion of air generated in the gap between the sleeve 8 and the shaft 5 by rotation of the sleeve 8 on the shaft 5.

Compressed air is fed into the trapped volume 9 at the blind end of the sleeve member 8 through the air duct 14 and the feed jet 17. The pressure of air built up in the trapped volume 9 provides a hydrostatic air bearing supporting the sleeve member 8 longitudinally on the shaft 5. The compressed air is air fed at an inlet pressure in excess of that required to balance the normal downwards end loading acting on the sleeve 8 in the direction of the arrow A. Under normal end loading conditions the sleeve 8 assumes its normal operating attitude on the shaft 5 as shown in FIG. 3 i.e., with the port 11 just covered by the end of the shaft 5. In this condition the air pressure in the trapped volume 9 automatically adjusts so that the product of the resultant pressure and the projected area of the blind end of the sleeve 8 results in a total force sufficient to support the applied end load. Transient variations in end loading acting on the sleeve 8 are accommodated by longitudinal movement of the sleeve 8 on the shaft 5. For example a transient additional downwards end loading on the sleeve 8 forces the sleeve 8 down on to the shaft 5 in the direction of the arrow A. The port 11 in the sleeve 8 is totally covered by the shaft 5, thus reducing the gas flow out of the trapped volume 9 and because the feed jet 17 is of restricted corss-section the pressure drop over the feed jet 17 is reduced and the pressure of air within the trapped volume 9 adjusts to that of the air duct 14 to counter-balance the additional downwards loading on the sleeve 8. On return to normal end loading conditions the sleeve 8 returns to its normal operational attitude on the shaft 5. If the sleeve 8 lifts upwards on the shaft 5 the port 11 in the sleeve 8 is uncovered by the shaft 5 and the air flow from the trapped volume 9 is increased, the pressure drop over the feed jet 17 is increased and the pressure of air in the trapped volume 9 adjusts to that of the ambient external pressure so that the supporting loading applied by the pressure of the air in the trapped volume 9 falls and the sleeve 8 drops back to assume its normal operational attitude on the shaft 5.

During normal operation the above operations occur with negligible end movement and there is negligible loss of air from the trapped volume 9 because of the sizing of the feed jet 17 in the shaft 5 and the very high restriction to flow in the gap between the sleeve 8 and the shaft 5. Any rapid fluctuations in the position of the sleeve 8 in relation to the shaft 5 due to external mechanical or internal pneumatic causes are controlled by the two and stops 15 and 18. The external stop 18 is adjustable so that minimum clearance is allowed between it and the blind end of the sleeve 8 when the position of the port 11 relative to the shaft 5 adopts its normal operating position.

Figure 4:
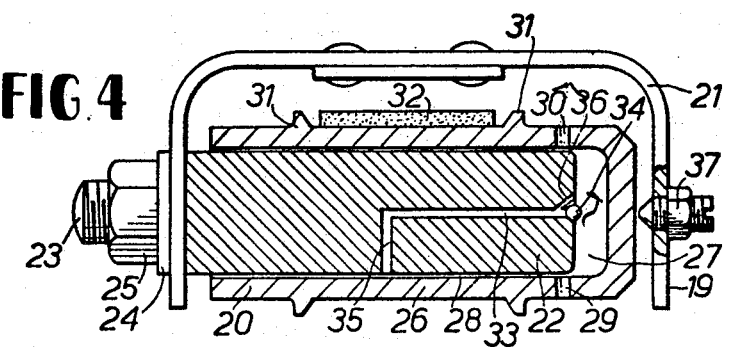

An alternative form of the invention is shown in FIG. 4 in which the air pressure generated in a hydrodynamic sleeve bearing is fed to supply the air pressure for a hydrostatic air bearing providing axial support for the sleeve.

The arrangement shown in FIG. 4 is basically similar to the arrangement shown in FIG. 3 and comprises a pulley assembly 19 in which a pulley 20 is located in a support member 21. A steel shaft 22 is mounted on the support member 21 by a washer 24 and a nut 25. The shaft 22 is surrounded by a close fitting sleeve 26 having a blind end providing a trapped volume 27 between the blind end of the sleeve 26 and the end of the shaft 22. The sleeve 26 is of aluminium and has a plastic lining 28, and two diametrically opposed vent ports 29 and 30 in the region of the trapped volume 27. The outer surface of the sleeve 26 is provided with two annular flanges 31 which are integral with the sleeve 26 and provide location for a driving belt 32. The shaft 22 has a precision ground outer surface and is provided with a longitudinally located air duct 33. The end of duct 33 leading into the trapped volume 27 being sealed by a ball end stop 34. A radial duct 35 located mid way along the shaft 22 connects the air duct 33 to the outer surface of the shaft 22. Immediately behind the ball end stop 34 a feed jet 36 connects the air duct 33 into the trapped volume 27. Opposed to the blind end of the sleeve 26 is an adjustable end stop 37 located in the support member 21.

Figure 5:
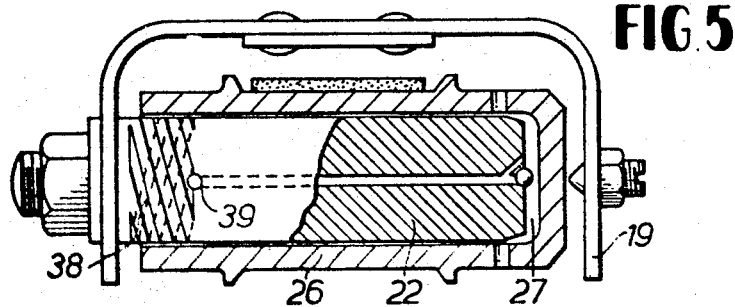

In operation of the arrangement of FIG. 4 the sleeve member 26 rotates on the shaft 22 as a hydrodynamic air lubricated bearing supporting the journal loading on the sleeve 26. The air pressure in the hydrodynamic bearing is at a maximum approximately mid way along the shaft 22. This generated air pressure is fed from the surface of the shaft 22 into the air duct 33 by the duct 35. From the air duct 33 the air feed jet 36 leads air from the duct into the trapped volume 27 to provide a hydrostatic bearing to support the end thrust loads on the bearing. The normal axial attitude of the sleeve 26 is as shown in FIG. 4 and as in the arrangement of FIG. 3 the axial position of the sleeve 25 on the shaft 22 is controlled by uncovering of the ports 29 and 30 with axial movements of the sleeve 26. The air pressure in the hydrostatic bearing automatically adjusts to the predetermined value which will maintain the sleeve 26 in the position related to normal end loading of the sleeve 26. The end stops 34 and 37 control any rapid fluctuations in the position of the sleeve 26 due to mechanical or internal pneumatic causes. The external stop 37 is adjustable so that minimum clearance is allowed between it and the blind end of the sleeve 26 when the ports 29 adopt their normal operating position relative to the shaft 22. FIG. 5 shows a modification of the embodiment shown in FIG. 4 in which the outer surface of the shaft 22 is provided with machined grooves 38. The grooves extend from the fixed end of the shaft 22 up to a duct 39, and are arranged so that as the sleeve 26 rotates around the shaft 22 air is drawn along the grooves into the hydrodynamic bearing clearance between the shaft 22 and the sleeve 26. This pumping action of the grooves 38 leads to increased air pressure being generated in the hydronamic bearing between the shaft 22 and the sleeve 26 and therefore will provide a greater air flow into the trapped volume 27 to sustain the hydrostatic bearing supporting the end thrusts in the pully assembly 19.

In alternative arrangements of the pulley assemblies the shafts may rotate relative to the bearing sleeves. In addition gas pumping grooves may be provided in the plastic lining of the bearing sleeves.

Figure 6:
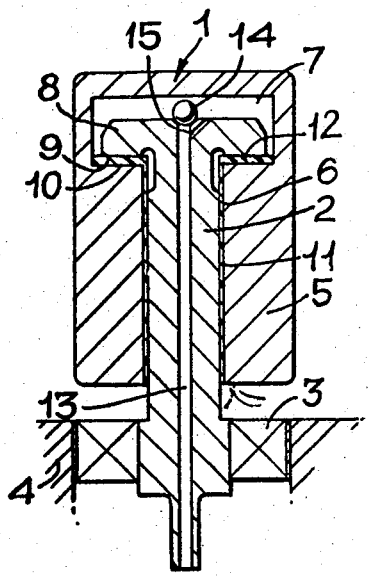

Referring to FIG. 6 of the drawings a bearing assembly 1 is shown in which a hardened steel shaft 2 is supported by a flexible mounting 3 in a structural member 4. The shaft 2 is surrounded by a close fitting bearing sleeve member 5 rotatable on the shaft 2. The bearing sleeve 5 has a blind ended bore which provides a trapped volume 7 between the blind end of the bearing sleeve 5 and the end of the shaft 2. The trapped volume 7 is of greater diameter than the bore 6 in order to accommodate an integral flange 8 on the end of the shaft 2. The flange 8 has a lower precision ground annular bearing surface 9 which is opposed by the face of an internal step 10 in the bore 6 of the bearing sleeve 5. The shaft 2 has a precision the shaft outer surface and the bore 6 of the bearing sleeve 5 has a plastic lining 11 formed with a surface of gas bearing quality complementary to the surface of the shaft 12. The bearing surface in the plastic lining 11 of the bearing sleeves may be formed for example by the method disclosed in our British Patent No. 979,731. The face of the internal step 10 in the bore 6 of the bearing sleeve 5 has a plastic coating 12 with a surface of gas bearing quality complementary to the surface 9 on the flange 8 of theshaft 2. The bearing surface of the plastic coating 12 is grooved to provide the gas pumping action between the bearing surfaces. Alternatively the metal bearing surface 9 may be grooved to achieve the same effect.

The shaft 2 is provided with a longitudinal internal air duct 13, the end of which leads into the trapped volume 7 and is sealed by a ball end-stop 14. A feed jet 15 of reduced diameter and located immediately below the ball end-stop 14 connects the air duct 13 into the trapped volume 7.

In operation of the bearing assbemly 1 shown in FIG. 6 the sleeve member 5 rotates on the shaft 2. The plastic lining 11 of the bearing sleeve 5 acts with the shaft 2 as a hydrodynamic air lubricated journal bearing, journal loads on the sleeve being supported by the pressurised cushion of air generated in the gap between the plastic lining 11 of the bearing sleeve 5 and the shaft 2 by rotation of the bearing sleeve 5 on the shaft 2. Compressed air is fed into the trapped volume 7 through the air duct 13 and the feed jet 15. The pressure of the air built up in the trapped volume 7 provides a hydrostatic air bearing cushion supporting the bearing sleeve 5 longitudinally on the shaft 2 against end thrusts acting on the bearing sleeve 5 in the direction towards the shaft 2. The pressure of the air acting in the trapped volume 7 causes the bearing sleeve 5 to take up a position on the shaft 2 such that a small clearance exists between the bearing surface 9 on the flange 8 of the shaft 2 and the bearing surface of the plastic coating 12 on the step 10 in the bearing sleeve 5. The bearing surface 9 on the flange 8 of the shaft 2 and the bearing surface of the plastic coating 12 on the step 10 of the bearing sleeve 5 thus co-operate to act as a hydrodynamic air lubricated thrust bearing working counter to the longitudinal end thrust acting on the bearing sleeve 5 due to the pressure of the air in the trapped volume 7. The bearing assembly 1 can thus operate in any attitude and at the same time maintain precise location of the sleeve member 5 on the shaft 2. If a failure of the compressed air supply to the bearing assembly 1 should occur the ball end stop 14 ensures that a safe running condition can be maintained for a reasonable period of time.

Figure 7:
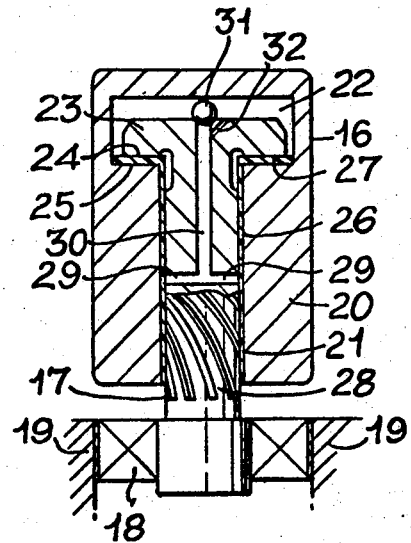

The arrangement shown in FIG. 7 is similar to the arrangement shown in fIG. 6 and comprises a bearing assembly 16 in which a shaft 17 is supported by a flexible mounting 18 in a structural member 19. The shaft 17 is surrounded by a close fitting bearing sleeve member 20 which is rotatable on the shaft 17. The bearing sleeve 20 has a blind ended bore 21 which provides a trapped volume 22 between the blind end of the sleeve 20 and the end of the shaft 17. The trapped volume 22 is of greater diameter than the bore 21 in order to accommodate an integral flange 23 on the end of the shaft 17. The flange 23 has a lower precision ground annular bearing surface 24 which is opposed by the face of an internal step 25 in the bore 21 of the bearing sleeve 20. The shaft 17 has a precision ground outer surface and the bore 21 of the bearing sleeve 20 has a plastic lining 24 formed with a surface of gas bearing quality complementary to the surface of the shaft 17. The face of the internal step 25 in the bore 21 of the bearing sleeve 20 has a plastic coating 27 with a surface of gas bearing quality complementary to the bearing surface 24 on the flange 23 of the shaft 17. The surface of the shaft 17 is provided with machined pumping grooves 28 extending from the fixed end of the shaft 17 up to radial ducts 29 located mid way along the shaft 17. The ducts 29 extend from the surface of the shaft 17 to a longitudinal duct 30 in the shaft 17. The duct 30 leads from the ducts 29 to the end of the shaft 17 in the trapped volume 22, the end of the duct 30 being sealed by a ball end stop 31. Immediately behind the ball end stop 31 a restricted feed jet 32 connects the duct 30 with the trapped volume 22. The surface of the plastic coating 27 on the face of the internal step 25 in the bore 21 of the bearing sleeve 20 is grooved to provide gas pumping action between the bearing surfaces. Alternatively the metal bearing surface 24 may be grooved to achieve the same effect.

In operation of the bearing assembly 16 shown in FIG. 7 the sleve member 20 rotates on the shaft 17 as a hydrodynamic air lubricated journal bearing, journal loads on the sleeve 20 being supported by the pressurised cushion of air generated in the gap between the plastic lining 26 of the sleeve 20 and the bearing surface of the shaft 17 by rotation of the sleeve member 20 on the shaft 17 and by the action of the pumping grooves 28 on the shaft 17. The air pressure in the hydrodynamic journal bearing is at a maximum approximately mid way along the shaft 17. Thus compressed air is fed from the surface of the shaft 17 into the duct 30 by the ducts 29. From the duct 30 the air feed jet 32 feeds the compressed air into the trapped volume 22 to provide a hydrostatic air bearing cushion supporting the bearing sleeve 20 longitudinally on the shaft 17 against end thrusts acting on the bearing sleeve 20 in the direction towards the shaft 17. The pressure of the air acting in the trapped volume 22 causes the bearing sleeve 20 to take up a position on the shaft 17 such that a small clearance exists between the bearing surface 24 on the flange 23 of the shaft 17 and the bearing surface of the plastic coating 27 on the face of the internal step 25 in the bore 21 of the bearing sleeve 20. The bearing surface 24 and the bearing surface of the plastic coating 27 thus co-operate to act as a hydrodynamic air lubricated thrust bearing working counter to the longitudinal thrust acting on the bearing sleeve 20 due to the pressure of the air in the trapped volume 27. If the air supply to the trapped volume 22 is curtailed in any way the ball end stop 31 ensures that safe running conditions can be maintained for a reasonable period of time.

Figure 8:
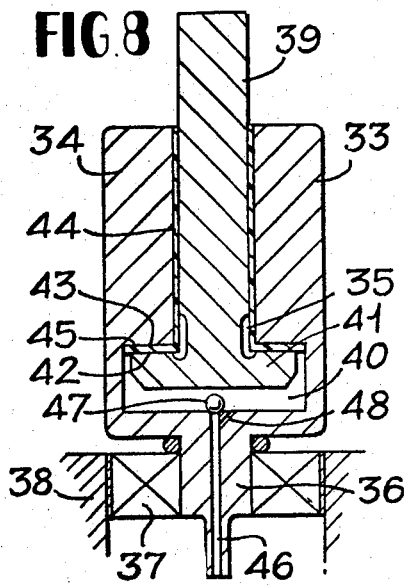
FIGS. 8 and 9 are elevations of journal gas bearing assemblies having a shaft rotatable in a stationary bearing sleeve.

FIG. 8 shows a bearing assembly 33 comprising a bearing sleeve member 34 having a blind ended bore 35. The bearing sleeve 34 has an axial extension 36 by means of which the bearing sleeve 34 is supported by a flexible mounting 37 from a structural member 38. A shaft 39 is rotatable within the bore 35 of the bearing sleeve 34. The blind ended bore 35 of the bearing sleeve 34 provides a trapped volume 40 between its blind end and the end of the shaft 39. The trapped volume 40 is of greater diameter than the bore 35 in order to accommodate an integral flange 41 on the end of the shaft 39. The flange 41 has an upper precision ground annular bearing surface 42 which is opposed by the face of an annular internal step 43 in the bore 35 of the bearing sleeve 34. The shaft 39 has a precision ground outer surface and the bore 35 of the bearing sleeve 34 has a plastic lining 44 formed with a bearing surface of gas bearing quality complementary to the surface of the shaft 39. The face of the internal step 43 in the bore 35 of the bearing sleeve 34 has a plastic coating 45 with a surface of gas bearing quality complementary to the bearing surface 42 on the flange 41 of the shaft 39. The bearing surface of the plastic coating 45 or the complementary bearing surface 42 is grooved to provide the gas pumping action between these bearing surfaces when the shaft 39 is rotated.

The extension 36 of the sleeve member 34 is provided with an internal air duct 46, the end of which leads into the trapped volume 40 and is sealed by a ball end-stop 47. A feed jet 48 of reduced diameter and located immediately below the ball end stop 47 connects the air duct 46 into the trapped volume 40.

In operation of the bearing assembly 33 shown in FIg. 8, the shaft 39 rotates within the stationary sleeve 34. The complementary gas bearing surfaces of the plastic lining 44 and the shaft 39 act as a hydrodynamic air lubricated journal bearing supporting journal loads with the pressurised cushion of air generated in the gap between the bearing surfaces. Compressed air is fed into the trapped volume 40 through the air duct 46 and the feed jet 48. The air pressure built up in the trapped volume 40 provides a hydrostatic air bearing cushion supporting the shaft 39 against downwards end thrusts in the bearing sleeve 34. The pressure of the air acting in the trapped volume 40 causes the shaft 39 to take up a position in the bearing sleeve 34 such that a small clearance exists between the bearing surface 42 on the flange 41 of the shaft 39 and the bearing surface of the plastic coating 45 on the face of the internal step 43 in the bore 35 of the bearing sleeve 34. The bearing surface 42 and the bearing surface of the plastic coating 45 thus co-operate to act as a hydrodynamic air lubricated thrust bearing working counter to the longitudinal thrust acting on the bearing sleeve 34 due to the pressure of the air in the trapped volume 40. The bearing assembly 33 can thus operate in any required attitude and at the same time maintain precise longitudinal location of the shaft 39 in the sleeve member 34. If a failure of the compressed air supply to the bearing assembly 33 occurs the ball end stop 47 ensures that a safe running condition can be maintained for a reasonable period of time.

Figure 9:
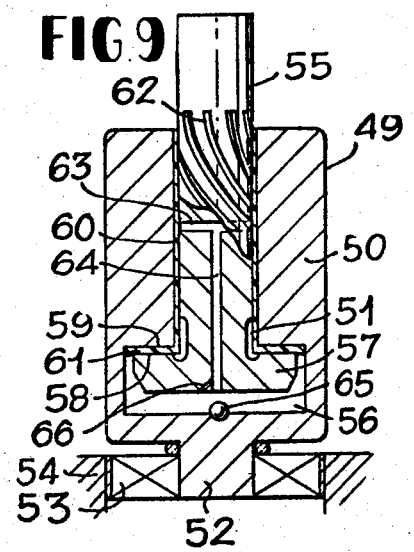

The bearing assembly 49 shown in FIG. 9 is similar to that shown in FIG. 8 and comprises a bearing sleeve member 50 having a blind ended bore 51. The bearing sleeve 50 has an axial extension 52 by means of which the bearing sleeve 50 is supported by a flexible mounting 53 from a structural member 54. A shaft 55 is rotatable within the bore 51 of the bearing sleeve 50. The blind ended bore 51 of the bearing sleeve 50 provides a trapped volume 56. The trapped volume 56 is of greater diameter than the bore 51 in order to accommodate an integral flange 57 on the end of the shaft 55. The flange 57 has an upper precision ground annular bearing surface 58 which is opposed by the face of an annular internal step 59 in the bore 51 of the bearing sleeve 51. The shaft 55 has a precision ground outer surface and the bore 51 of the bearing sleeve 50 has a plastic lining 60 formed with a bearing surface of gas bearing quality complementary to the surface of the shaft 55. The face of the internal step 59 in the bore 51 of the bearing sleeve 50 has a plastic coating 61 with a surface of gas bearing quality complementary to the bearing surface 58 on the flange 57 of the shaft 55. The bearing surface of the plastic coating 61 is grooved to provide gas pumping action between these bearing surfaces when the shaft 55 is rotated. The surface of the shaft is provided with machined pumping grooves 62 extending from the open end of the bearing sleeve 50 up to radial ducts 63 located mid way along the shaft 55 and extending from the surface of the shaft into a longitudinal duct 64 in the shaft 55. The duct 64 leads to the end of the shaft 55 and is sealed at its end. Immediately opposite the sealed end of the duct 64 a ball end stop 65 is located in the bearing sleeve 50. A feed jet 66 connects the duct 64 into the trapped volume 56.

In operation of the bearing assembly 49 shown in FUIG. 9 the shaft 55 rotates in the fixed bearing sleeve 50, hydrodynamic air lubrication being sustained between the bearing surface of the shaft 55 and the bearing surface of the plastic lining 60 of the bearing sleeve 50. Journal loads on the shaft 55 are supported by the pressurised cushion of air generated in the gap between the shaft 55 and the plastic lining 60 of the bearing sleeve 50. The pressure generated is due to rotation of the shaft 55 in the bearing sleeve 50 and due to the pumping action of the grooves 62 on the surface of the shaft 55. Maximum pressure is generated about mid way along the shaft 55 in the region of the radial ducts 63 in the shaft 55. Thus compressed air is fed through the ducts 63 and the longitudinal duct 64 in the shaft 55 is fed from the duct 64 through the air feed jet 66 into the trapped volume 56 at the blind end of the bore 51 in the bearing sleeve 50. This provides a hydrostatic air bearing cushion in the trapped volume 56 supporting the shaft 55 longitudinally against downwards end thrusts in the bearing sleeve 50. The pressure of the air acting in the trapped volume 56 causes the shaft 55 to take up a position in the bearing sleeve 50 such that a small clearance exists between the bearing surface 58 on the flange 57 of the shaft 55 and the bearing surface of the plastic coating 61 on the face of the internal stop 59 in the bearing sleeve 50. The bearing surface 58 and the bearing surface of the plastic coating 61 thus co-operate to act as a hydrodynamic air lubricated thrust bearing working counter to the longitudinal thrust acting on the shaft 55 due to the pressure of the air into the trapped volume 56. If the air supply to the trapped volume 56 is interrupted to the ball end stop 65 ensures that safe running conditions can be maintained for a reasonable period of time.

I claim:

1. A journal gas bearing assembly comprising a shaft and a complementary bearing sleeve rotatable one relative to the other, the shaft and the bearing sleeve having co-operating bearing surfaces of a quality such that gas lubrication can be sustained between the shaft and the bearing sleeve, longitudinal movement of the shaft and the bearing sleeve one relative to the other in one direction being limited by a hydrostatic thrust bearing formed by a cushion of gas trapped under pressure in a closed volume defined between the shaft and the bearing sleeve, and passage means leading directly into the closed volume for conveying compressed gas to the hydrostatic thrust bearing.

2. A journal gas bearing assembly as claimed in claim 1 wherein means are provided for limiting longitudinal movement of the shaft and the bearing sleeve one relative to the other in the reverse direction to the direction in which the hydrostatic thrust bearing limits relative longitudinal movement between the shaft and the bearing sleeve.

3. A journal gas bearing assembly as claimed in claim 2, wherein said means for limiting longitudinal movement of the shaft and the bearing sleeve one relative to the other in the reverse direction comprises means for venting the cushion of gas in the hydrostatic thrust bearing at the beginning of relative longitudinal movement between the shaft and the bearing sleeve in the reverse direction.

4. A journal gas bearing assembly as claimed in claim 2 wherein said means for limiting longitudinal movement of the shaft and the bearing sleeve one relative to the other in the reverse direction comprises a hydrodynamic thrust gas bearing acting between the shaft and the bearing sleeve in the opposite sense to which the hydrostatic thrust bearing acts between the shaft and the bearing sleeve.

5. A gas bearing assembly as claimed in claim 1 wherein said means for feeding compressed gas to the hydrostatic thrust bearing comprises an external source of compressed gas and means for supplying compressed gas from the source to the hydrostatic thrust bearing.

6. A gas bearing assembly as claimed in claim 1 wherein said means for feeding compressed gas to the hydrostatic thrust bearing comprises means for supplying compressed gas from the interspace between the bearing surfaces of the shaft and the bearing sleeve to the hydrostatic thrust bearing.

7. A journal gas bearing assembly comprising a fixed shaft a bearing sleeve rotatable on the shaft the surface of the shaft and the bore of the bearing sleeve having co-operating bearing surfaces of a quality such that gas lubrication can be sustained between the shaft and the bearing sleeve wherein the bearing sleeve is supported against longitudinal movement on the shaft in one direction by a hydrostatic thrust bearing formed by a cushion of gas trapped in a closed volume defined in the bore of the bearing sleeve between a transverse face on the shaft and a transverse face in the bore of the bearing sleeve, and passage means leading directly into the closed volume for conveying compressed gas to the hyddrostatic thrust bearing.

8. A journal gas bearing assembly as claimed in claim 7 wherein the bearing sleeve has a blind ended bore and the closed volume is defined between the blind end of the bore of the bearing sleeve and the end face of the shaft in the bore of the bearing sleeve.

9. A journal gas bearing assembly as claimed in claim 7 wherein the means for feeding compressed gas to the hydrostatic thrust bearing comprises a passageway in the shaft leading to the closed volume defined in the bore of the bearing sleeve, compressed gas being fed from an external source of gas under pressure through the passageway in the shaft into the closed volume defined in the bore of the bearing sleeve.

10. A journal gas bearing assembly as claimed in claim 7 wherein said means for feeding compressed gas to the hydrostatic thrust bearing comprises a passageway in the shaft leading from the bearing interspace between the surface of the shaft and the bore of the bearing sleeve to the closed volume defined in the bore of the bearing sleeve.

11. A journal gas bearing assembly as claimed in claim 10 wherein pumping grooves are provided on a region of the surface of the shaft or in the corresponding region of the bore of the bearing sleeve, said passageway leading from the region of the pumping grooves to the closed volume defined in the bore of the bearing sleeve.

12. A journal gas bearing assembly as claimed in claim 9 wherein the passageway connects with the closed volume defined in the bore of the bearing sleeve through an orifice of restricted cross section.

13. A journal gas bearing assembly as claimed in claim 7 wherein means are provided for limiting longitudinal movement of the bearing sleeve on the shaft in the opposite direction to the direction in which the bearing sleeve is supported against longitudinal movement on the shaft by the hydrostatic thrust bearing.

14. A journal gas bearing assembly as claimed in claim 13 wherein a vent hole is provided in the wall of the bearing sleeve positioned so as to be obstructed by the surface of the shaft when the bearing sleeve is in its normal running position on the shaft supported against longitudinal movement, in the one direction, on the shaft by the hydrostatic thrust bearing and such that on initial longitudinal movement of the bearing sleeve on the shaft in the opposite direction, the vent hole in the bearing sleeve is uncovered by the shaft so that the closed volume in the bore of the bearing sleeve defining the hydrostatic thrust bearing is vented to atmosphere.

15. A journal gas bearing assembly as claimed in claim 13 wherein a hydrodynamic thrust bearing is provided defined between a transferse annular bearing surface of the bearing sleeve and a corresponding transverse annular gearing surface on the shaft, said hydrodynamic thrust bearing supporting the bearing sleeve longitudinally on the shaft in the opposite direction to which the hydrostatic thrust bearing supports the bearing sleeve longitudinally on the shaft.

16. A journal gas bearing assembly as claimed in claim 15 wherein the bore of the bearing sleeve has a blind end and leads through a step into a part of larger diameter at the blind end of the bore, the annular end face of the step forming one bearing surface of the hydrodynamic thrust bearing, the shaft having an end flange in the part of larger diameter at the blind end of the bore of the bearing sleeve, the annular end face of the flange facing the annular end face of the step in the bore of the bearing sleeve forming the other bearing surface of the hydrodynamic thrust bearing.

17. A journal gas bearing assembly as claimed in claim 7 wherein the shaft is flexibly mounted and has a low transverse moment of inertia.

18. A journal gas bearing assembly as claimed in claim 7 wherein the bearing sleeve is driven by a friction drive member engaging the bearing sleeve tangentially within the region between the ends of the shaft.

19. A journal gas bearing assembly comprising a fixed bearing sleeve, a shaft rotatable in the bearing sleeve, the surface of the shaft and the bore of the bearing sleeve having cooperating bearing surfaces of a quality such that gas lubrication can be sustained between the shaft and the bearing sleeve wherein the shaft is supported against longitudinal movement in the bearing sleeve in one direction by a hydrostatic thrust bearing formed by a cushion of gas trapped in a closed colume defined in the bore of the bearing sleeve between a transverse face on the shaft and a transferse face in the bore of the bearing sleeve, and passage means leading directly into the closed volume for conveying compressed gas to the hydrostatic thrust bearing.

20. A journal gas bearing assembly as claiemd in claim 19 wherein the bearing sleeve has a blind ended bore and the closed volume is defined between the blind end of the bore of the bearing sleeve and the end face of the shaft in the bore of the bearing sleeve.

21. A journal gas bearing as claimed in claim 19 wherein the means for feeding compressed gas to the hydrostatic thrust bearing comprises an inlet port in the bearing sleeve connecting an external source of gas under pressure with the closed volume defined in the bore of the bearing sleeve.

22. A journal gas bearing assembly as claimed in claim 19 wherein said means for feeding compressed gas to the hydrostatic thrust bearing comprises a passageway in the shaft leading from the bearing interspace between the surface of the shaft and the bore of the bearing sleeve to the closed volume defined in the bore of the bearing sleeve.

23. A journal gas bearing assembly as claimed in claim 22 wherein pumping grooves are provided on a region of the surface of the shaft or in the corresponding region of the bore of the bearing sleeve, said passageway leading from the region of the pumping grooves to the closed volume defined in the bore of the bearing sleeve.

24. A journal gas bearing assembly as claimed in claim 22 wherein the passageway connects with the closed volume defined in the bore of the bearing sleeve through an orifice of restricted cross section.

25. A journal gas bearing assembly as claimed in claim 19 wherein means are provided for limiting longitudinal movement of the shaft in the bearing sleeve in the opposite direction to the direction in which the shaft is supported against longitudinal movement in the bearing sleeve by the hydrostatic thrust bearing.

26. A journal gas bearing assembly as claimed in claim 25 wherein a vent hole is provided in the wall of the bearing sleeve, positioned so as to be obstructed by the surface of the shaft when it is in its normal running position in the bearing sleeve, supported against longitudinal movement, in the one direction, in the bearing sleeve by the hydrostatic thrust bearing and such that on initial longitudinal movement of the shaft in the bearing sleeve in the opposite direction the vent hole in the bearing sleeve is uncovered by the shaft so that the closed volume in the bore of the bearing sleeve defining the hydrostatic thrust bearing is vented to atmosphere.

27. A journal gas bearing assembly as claimed in claim 25 wherein a hydroynamic thrust bearing is provided defined between a transverse annular bearing surface of the bearing sleeve and a corresponding transverse annular bearing surface on the shaft, said hydrodynamic thrust bearing supporting the shaft longitudinally in the bearing sleeve in the opposite direction to which the hydrostatic thrust bearing supports the shaft longitudinally in the bearing sleeve.

28. A journal gas bearing assembly as claimed in claim 27 wherein the bore of the bearing sleeve has a blind end and leads through a step into a part of larger diameter at the blind end of the bore, the annular end face of the step forming one bearing surface of the hydrodynamic thrust bearing, the shaft having an end flange in the part of larger diameter at the blind end of the bore of the bearing sleeve, the annular end face of the flange facing the annular end face of the step in the bore of the bearing sleeve forming the other bearing surface of the hydrodynamic thrust bearing.

29. A journal gas bearing assembly as claimed in claim 19 wherein the bearing sleeve is flexibly mounted and has a low transverse moment of inertia.

30. A journal gas varying assembly as claimed in claim 10 wherein the passageway connects with the closed volume defined in the bore of the bearing sleeve through an orifice of restricted cross section.

31. A journal gas bearing assembly as claimed in claim 23 wherein the passageway connects with the closed volume defined in the bore of the bearing sleeve through an orifice of restricted cross section.

* * * * *